United States Patent [19]

Casler, Jr. et al.

[11] Patent Number: 5,513,096
[45] Date of Patent: Apr. 30, 1996

[54] MULTI-AXIS MOTION CONTROLLER AND LID DISPENSER

[75] Inventors: Richard J. Casler, Jr., Newtown, Conn.; Kenneth E. Daggett, Murrysville, Pa.; Jeffrey R. Davis, Sandy Hook; George E. Riehm, New Fairfield, both of Conn.

[73] Assignee: Connecticut Innovations, Inc., Rocky Hill, Conn.

[21] Appl. No.: 911,718

[22] Filed: Jul. 10, 1992

[51] Int. Cl.⁶ ................................................. G06F 15/46
[52] U.S. Cl. ........................... 364/140; 364/141; 395/842
[58] Field of Search ..................................... 364/132, 140, 364/141, 146, 147, 136, DIG. 2, 926.9, 949, 957.1; 395/275

[56] References Cited

U.S. PATENT DOCUMENTS

| | | | |
|---|---|---|---|
| 2,919,830 | 1/1960 | Anderson | 221/11 |
| 3,364,959 | 1/1968 | Herman | 141/155 |
| 3,492,785 | 2/1970 | Mancini | 53/282 |
| 3,572,007 | 3/1971 | Shelby et al. | 53/282 |
| 3,704,810 | 12/1972 | Sakai | 221/236 |
| 4,098,058 | 7/1978 | Carrigan et al. | 53/315 |
| 4,099,668 | 7/1978 | Feilchenfeld et al. | 324/304 |
| 4,226,269 | 10/1980 | Carr et al. | 141/361 |
| 4,282,698 | 8/1981 | Zimmerman | 53/282 |
| 4,297,828 | 11/1981 | Krieger et al. | 53/282 |
| 4,319,441 | 3/1982 | Credle | 53/131 |
| 4,409,530 | 10/1983 | Neeper et al. | 318/685 |
| 4,558,802 | 12/1985 | Molison | 221/11 |
| 4,568,816 | 2/1986 | Casler, Jr. | 219/124.34 |
| 4,594,838 | 6/1986 | Ficken et al. | 53/471 |
| 4,618,073 | 10/1986 | Bartfield et al. | 221/222 |
| 4,630,188 | 12/1986 | Daggett | 363/129 |
| 4,727,305 | 2/1988 | Muskovac et al. | 318/798 |
| 4,763,055 | 8/1988 | Daggett et al. | 318/368 |
| 4,772,831 | 9/1988 | Casler, Jr. et al. | 378/568 |
| 4,786,847 | 11/1988 | Daggett et al. | 318/568 |
| 4,807,153 | 2/1989 | Onaga et al. | 364/513 |
| 4,851,748 | 7/1989 | Daggett et al. | 318/568.2 |
| 4,864,204 | 9/1989 | Daggett et al. | 318/568.2 |
| 4,864,206 | 9/1989 | Onaga et al. | 318/568.11 |
| 4,868,472 | 9/1989 | Daggett | 318/568.2 |
| 4,868,474 | 9/1989 | Lancraft et al. | 318/568.2 |
| 4,874,997 | 10/1989 | Daggett et al. | 318/568.1 |
| 4,876,494 | 10/1989 | Daggett et al. | 318/568.22 |
| 4,894,598 | 1/1990 | Daggett | 318/568.16 |
| 4,896,087 | 1/1990 | Onaga et al. | 318/568.2 |
| 4,902,944 | 2/1990 | Daggett et al. | 318/568.11 |
| 4,908,556 | 3/1990 | Daggett et al. | 318/568.2 |
| 4,925,312 | 5/1990 | Onaga et al. | 364/513 |
| 4,949,526 | 8/1990 | Brogna et al. | 53/306 |
| 4,962,338 | 10/1990 | Daggett et al. | 318/568.11 |
| 4,980,838 | 12/1990 | Daggett et al. | 318/568.16 |
| 4,989,753 | 2/1991 | Brogna et al. | 221/4 |
| 5,000,345 | 3/1991 | Brogna et al. | 221/5 |
| 5,025,390 | 6/1991 | Daggett | 364/513 |
| 5,162,986 | 11/1992 | Graber et al. | 364/146 |

Primary Examiner—Roy N. Envall, Jr.
Assistant Examiner—Cameron H. Tousi
Attorney, Agent, or Firm—DeLio & Peterson

[57] ABSTRACT

A multi-axis motion controller includes a digital signal processor operable in a standalone mode to run a motion control application program for controlling motion along multiple axes is organized in a shared memory architecture and includes a serial I/O data system with DMA access to the memory for repeatedly moving input and output data directly between the memory and a serial data line. The motion controller may be utilized in connection with a cup lid dispenser for an automated drinkmaker having a pivotable shuttle arrangement for dispensing the bottommost lid in a stack, and a double lid sensor for determining if more than one lid has been dispensed.

24 Claims, 14 Drawing Sheets

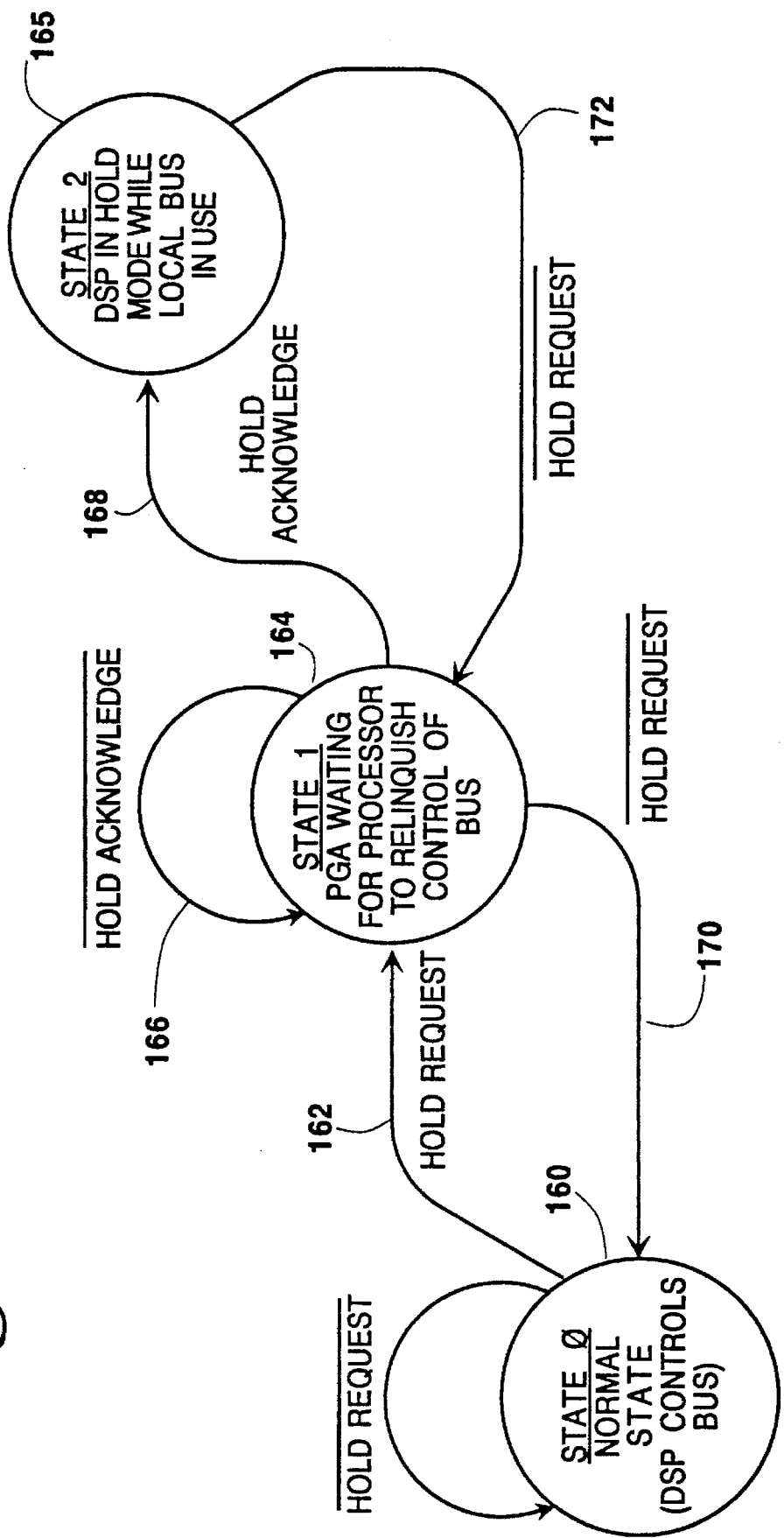

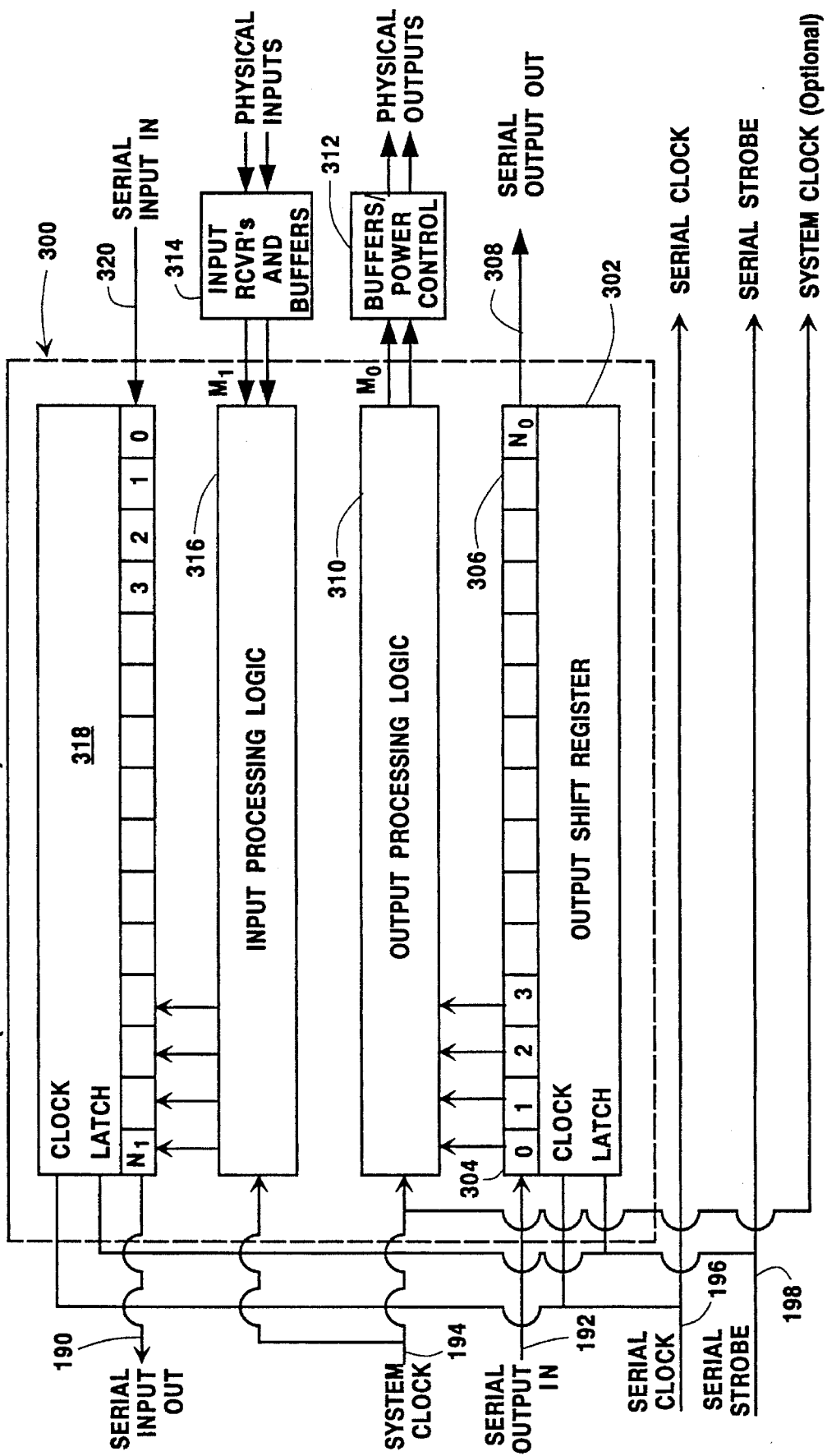

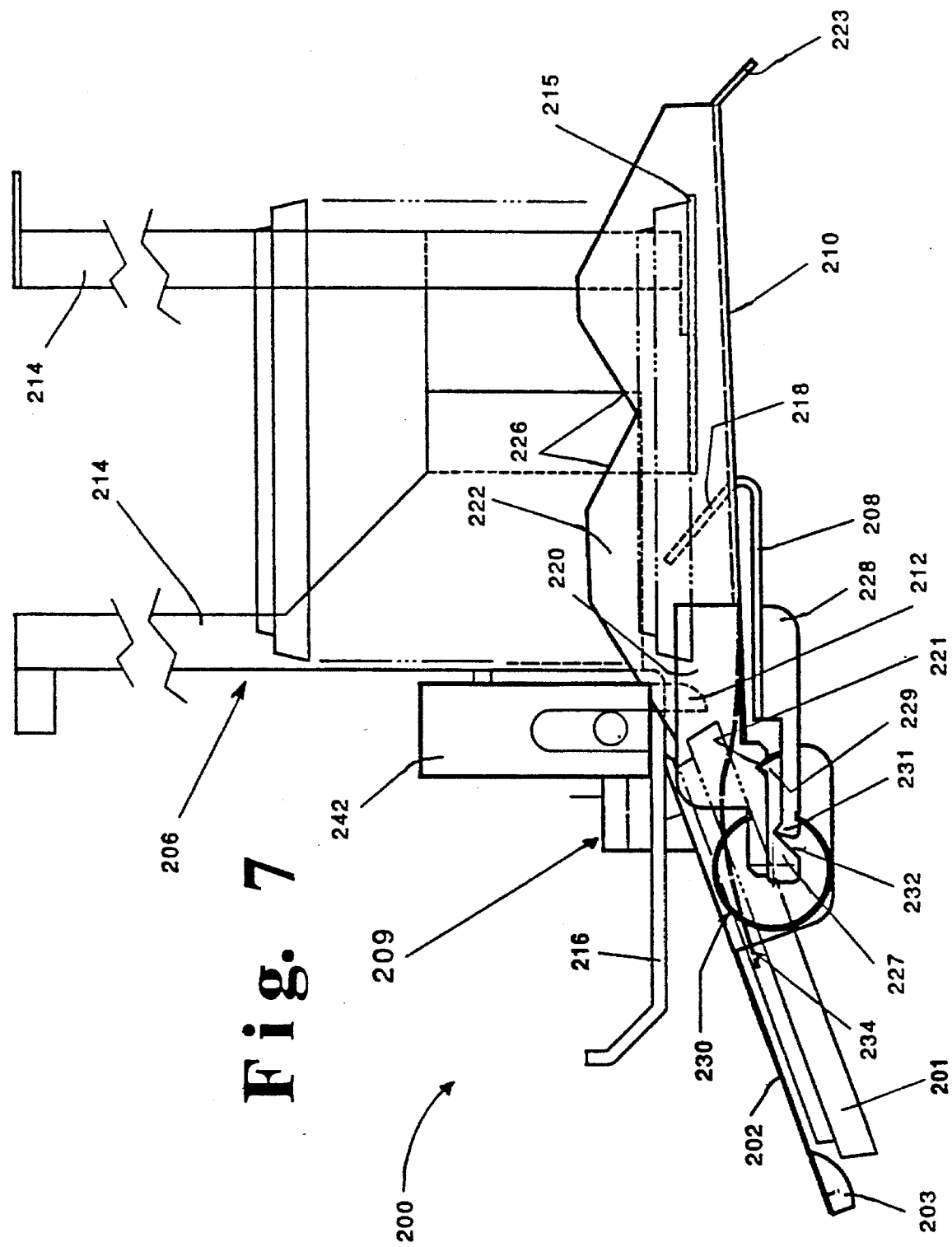

MULTI-AXIS MOTION CONTROLLER AND LID DISPENSER

BACKGROUND OF THE INVENTION

1. Field of the Invention

This invention relates to motion controllers used to control multiple step motors and/or servos in coordinated multi-axis motion. The invention particularly relates to motion controllers with digital signal processors in standalone and multiprocessor implementations which use serial input and output for at least some controlled functions. The present invention also relates to a lid dispensing and application arrangement which may be controlled by the motion controller of the present invention.

2. Description of Related Art

Motion controllers are widely used to control various types of automated machinery and material handling equipment. By way of example, the motion controller disclosed herein is suited for controlling the automated drink mixer system described in U.S. Pat. No. 5,000,345.

The functioning of a motion controller may generally be divided into the motor control aspect, wherein multiple motors/servos are driven in coordinated motion to move an object along a defined trajectory, and the input/output aspect wherein input and output data are sent to and from various sensors and actuators.

A simple example of input data would be the signal from a location sensor which is triggered by a light sensor or a microswitch position sensor indicating that material being handled had reached a known location. An example of output data would be a signal turning on an indicator light on a control panel or operating a relay to release an object for subsequent handling by the motors.

To provide the motor control, the motion controller must often perform intensive signal processing calculations. To provide multiple motor control, these calculations may tax the capabilities of the processor performing them, even where the processor is a digital signal processor (DSP), which is optimized for such tasks. To provide the I/O functions, data handling, memory accessing and other more generalized computer functions are used.

In prior art designs, the I/O, data handling and control functions have generally been implemented in a general purpose microprocessor. The digital signal motor control calculations have often been given to a dedicated digital signal processor which operates as a slave to the general purpose microprocessor. This solution is expensive, as it employs multiple processors. Some multiple processor designs have used a single DSP for each motor or a single DSP for each trajectory being calculated.

Many prior art motion controllers have been dedicated to particular tasks and are designed for use with specific equipment. They have usually included multiple inputs and outputs assigned to various tasks. One output might control a specific relay or a specific type of relay. An input might be designated to receive encoder data, while another input might be for a sensor. The number of specific inputs and outputs has made it difficult to fit all the connectors onto a single panel.

The variety of drivers, buffers, translators and other associated electronics for the motor and I/O inputs and outputs has made such controllers ill suited for use with anything other than the equipment for which it was originally designed.

The present invention provides improvements in both the motor control area and in the input/output system by optimizing the use of a digital signal processor for use in those tasks where it is required, in combination with a serial I/O system that offloads various housekeeping, memory addressing and control functions from the DSP.

The DSP may be operated in a standalone mode in the majority of applications to control multiple motors and multiple trajectories simultaneously with good response on all axes.

The input/output system of this invention has been implemented serially which permits the application specific electronics associated with driving outputs and formatting input data to be placed in remote digital I/O locations near the motors and I/O sources. This lets the motion controller function in numerous applications, and only the electronics for a particular application needs to be supplied in the customized digital input/output systems. Unused electronics for other applications is avoided without compromising flexibility in the controller.

A further advantage is that input/output conversion can be done at remote digital I/O units, near the source, instead of at the controller. This minimizes the possibility of errors being introduced in long cable runs from the controller.

In many prior art designs, the input data and output data is processed by the microprocessor which involves a significant waste of processor time through the overhead involved in addressing and moving the input/output data to and from memory. Accordingly, one object of the present invention is to provide a low cost motion controller in which the digital signal processor operates in a standalone mode.

A further object of the present invention is to provide a design in which input/output data is transmitted serially to remote input/output devices.

SUMMARY OF THE INVENTION

In accordance with the teachings herein, the present invention provides a multi-axis motion controller comprising a digital signal processor operable in a standalone mode to run a motion control application program for controlling motion along multiple axes. The digital signal processor has shared read and write access to a digital memory organized in a shared memory architecture. The memory may be shared by at least one other device. A first portion of the shared digital memory stores input data received from input devices and a second portion of the memory stores output data to be send to output devices. A serial input/output system (SIO) includes a serial data line for serially transferring the input and output data to and from input and output devices, and DMA access means which repeatedly moves the input and output data directly between the memory and the serial data line, without passing the data through the digital signal processor. The DMA access means has shared read and write access to the digital memory. In one embodiment, the memory can also be shared by other coprocessors.

By means of this design, the DSP spends very little time in handling the input and output of data. The digital signal processor merely reads up-to-date input data from the shared memory location whenever necessary. The input data is repeatedly updated by the DMA access means as it repeatedly moves fresh input data from the serial data line into the shared input data memory locations.

Correspondingly, the digital signal processor simply places any data it needs to output into the shared output data portions of the digital memory. The DMA access means repeatedly moves the output data directly from the memory onto the serial data line, and out to the real world where it is handled by the digital I/O system.

In the preferred design, the motion controller also includes motor control means, implemented in either a step motor driver board or a real/time clock interfaced board, wherein the DSP directly controls the location of a plurality of motors under the direction of one or more application control programs, executing concurrently on the DSP, either in an interrupt driver or time-sliced manner.

The serial input/output system preferably runs synchronously under the control of a clock and includes a serial shift register having an input and output end. The input end simultaneously shifts in the input data from the serial data line as the output end serially shifts out the output data.

In one aspect, the DMA access means includes means for parallel reading the input data from the serial shift register after the last of the output data has been shifted out of the serial shift register and means for writing the input data to the shared digital memory for use by the digital signal processor thereafter.

The DMA access means further includes means for writing a new set of output data from the shared digital memory and means for parallel writing the new set of output data into the shift register. The DMA access means may be implemented in a programmable gate array.

The invention may also include a second processor connected to the digital signal processor via a multiprocessor bus. In this embodiment, the digital signal processor may run in master mode and the second processor runs in slave mode, or the processors may run in peer to peer mode and both processors share all the digital memory. The second processor may be either a second digital signal processor or a general purpose microprocessor.

A bus arbitrator for arbitrating access to the multiprocessor bus may be implemented in a programmable gate array and in a preferred design, this programmable gate array is loaded by an EPROM which is socketed and replaceable with another EPROM reprogrammed to run the digital signal processor in a slave mode and the second processor in a master mode, thereby providing flexibility in using the motion controller.

The serial input/output means preferably includes a digital input/output means connected to the serial data line, for driving a plurality of output devices responsive to output data received from the serial data line and for receiving input data from a plurality of input devices and sending it on to the DMA access means via the serial data line.

The digital input/output means typically includes various driver and buffer circuitry as needed to drive relays or convert high voltage input signals to the serial format. The digital input/output means may be implemented in a programmable gate array as well.

The serial input/output design permits multiple digital input/output means connected to be remotely located from the remainder of the motion controller. Analog signals may be converted to digital format at the remotely located digital input/output means, and the remote digital input/output means may be daisy chained to one or more additional digital input/output means along the serial data line.

The multi-axis motion control is preferably mounted in a plug-in module which is adapted for generic use in different motion control applications and automated machinery. The plug-in module includes a plug-in connector for connection to an application specific wiring board through which the serial data line and motor control means receive and transmit signals.

The multi-axis motion controller also may include means for identifying the application specific wiring board to which the motion controller is connected.

The present invention also relates to a lid dispensing and application arrangement for separating lids from a stack of lids and applying the separated lids onto cups, comprising a lid dispenser supporting a stack of lids to be dispensed and a lid shuttle positioned near the bottom of the lid dispenser. The lid shuttle is supported for substantially linear translating and reciprocating movement between retracted and extended positions relative to the lid dispenser. The shuttle supports a lid engaging member designed to engage a first bottommost lid of the stack of lids and retain the first bottommost lid in a first intermediate position in the lid shuttle while the lid shuttle is moved in translation to the extended position. The lid shuttle may then be moved in translation to the retracted position during which the first lid is moved in translation within the lid shuttle to a second loaded position therein beneath a lid applicator supported by the lid shuttle. The lid shuttle is then moved to the extended position during which the first lid remains in the second loaded position while the lid engaging member simultaneously engages a second bottommost lid of the lid stack and retains the second lid in the first intermediate position in the lid shuttle. The lid shuttle is then moved in translation to the retracted position during which the lid applicator presses and applies the first lid onto a cup beneath the second loaded position and the second lid is moved in translation within the lid shuttle to the second loaded position. The cycle is repeated for subsequent lids during linear translating and reciprocating movements of the lid shuttle.

In one aspect of the lid dispensing and application arrangement, there is provided a lid dispenser supporting a stack of lids to be dispensed and a lid shuttle positioned near the bottom of the lid dispenser and supported for substantially linear translating and reciprocating movement between retracted and extended positions relative to the lid dispenser. The lid shuttle has a shuttle frame and a lid engaging member designed to engage a first bottommost lid of the stack of lids and to retain the first bottommost lid in a first intermediate position in the shuttle frame while the lid shuttle is moved in translation to the extended position. The lid dispenser further has a fixed wall blocking direct translational movement of the bottommost lid of the stack of lids. The shuttle frame and the lid engaging member are independently moveable to permit passage of the first bottommost lid beneath the wall, the wall being adapted to contact and move the first lid in translation within the lid shuttle toward a loaded position for application to a cup as the lid shuttle is moved in translation to the retracted position. Preferably, the shuttle frame and the lid engaging member are each independently pivotable about a fulcrum for downward movement to permit passage of the first bottommost lid beneath the wall, and the shuttle frame and lid engaging member are biased in a horizontal position by a spring.

In another aspect, the lid dispensing and application arrangement comprises a lid dispenser supporting a stack of lids to be dispensed and a lid shuttle positioned near the bottom of the lid dispenser and supported for substantially linear translating and reciprocating movement between retracted and extended positions relative to the lid dispenser. The lid shuttle has a shuttle frame and a lid engaging member designed to engage a first bottommost lid of the stack of lids and to retain the first bottommost lid in a first intermediate position in the shuttle frame while the lid shuttle is moved in translation to the extended position. The lid dispenser has a fixed wall blocking direct translational movement of the bottommost lid of the stack of lids. The shuttle frame is moveable to permit passage of the first bottommost lid beneath the wall. Preferably, the lid dispensing and application arrangement further includes a sensor for determining the degree of movement of the shuttle frame beneath the wall to detect the presence of extra lids or the absence of any lid engaged by the shuttle engaging member. More preferably, the shuttle frame has an edge of defined shape, such as a downward angle. The lid dispenser further includes a sensor adapted to detect the proper location of the shuttle frame edge as the shuttle frame carries a single lid beneath the wall, the sensor being further adapted to detect the presence of extra lids or the absence of any lid engaged by the shuttle engaging member.

In yet another aspect, the lid dispensing and application arrangement comprises a lid dispenser supporting a stack of lids to be dispensed and a lid shuttle positioned near the bottom of the lid dispenser and supported for substantially linear translating and reciprocating movement between retracted and extended positions relative to the lid dispenser. The lid shuttle supports a lid engaging member designed to engage a first bottommost lid of the stack of lids and to retain the first bottommost lid in a first intermediate position in the lid shuttle while the lid shuttle is moved in translation to the extended position. The lid shuttle further supports a lid applicator comprising an angled member and an underlying leaf spring for holding the first lid beneath and against the angled member in a second loaded position for application to a cup beneath the lid applicator as the lid shuttle is moved in translation to the retracted position.

BRIEF DESCRIPTION OF THE DRAWINGS

FIG. 3c is a state diagram describing local bus arbitration state transitions.

FIG. 4 is a description of a generalized digital I/O module adapted for daisy chain connection to other digital I/O modules.

FIGS. 5a and 5b and 6 illustrate two successive steps of dispensing a lid from a column of stacked lids and applying it onto a cup.

FIG. 7 illustrates a side elevational view of the lid dispenser of the present invention with the lid shuttle being in a retracted position, ready to pull a lid from the bottom of a lid stack.

DETAILED DESCRIPTION OF THE PREFERRED EMBODIMENTS

Description of the Motion Controller

Figure 1:
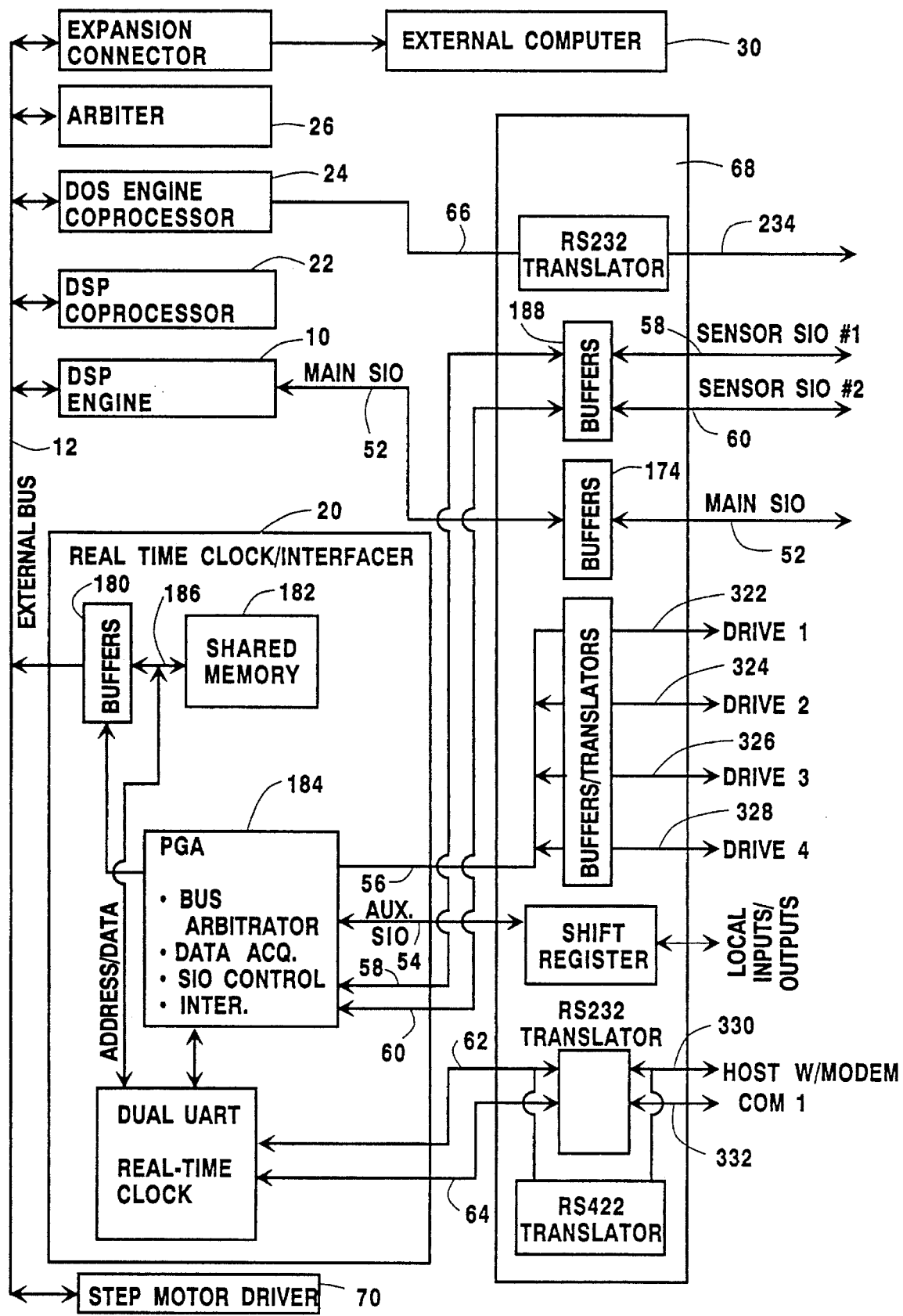
FIG. 1 provides a block diagram overview of the physical configuration of the system.

Referring to FIG. 1, one embodiment of the invention includes a digital signal processor (DSP) engine 10 connected to an external bus 12. The external bus includes address lines 14, data lines 16 and control lines 18, as shown more fully in FIG. 2a. In addition to the DSP engine 10, other devices may be attached to the external bus 12, including a real time clock/interfacer 20, a digital signal coprocessor board 22, a DOS engine coprocessor board 24, an arbiter 26, an expansion connector 28 for accessing an external computer 30 and/or a step motor driver 70.

The DSP engine 10 includes a digital signal processor 32 and shared memory comprising non-volatile memory E2ROM 34 and static RAM 36. In one embodiment of the invention there is up to 64K of E2ROM and 64K of static RAM.

A local bus comprising address lines 38, data lines 40 and various control lines connect the digital signal processor 32 with the shared memory 34, 36. The local bus is connected to the external bus via bi-directional buffer 42, so that the data may be moved along the local bus independent of data on the external bus 12.

The control lines 18 for the external bus operate through the bi-directional buffers 42 via control lines 44 and 46 from two programmable gate arrays (PGAs) 48 and 50. Programmable gate array 50 acts as an external bus interface with external bus arbitration by programmable gate array 48 whenever the external bus 12 has a second processor attached, such as either the DSP coprocessor 22 or the DOS engine coprocessor 24.

The digital signal processor 32 on the DSP engine 10 is operable in a standalone mode to run a motion control application program for controlling motion along multiple axes. In many applications, only the DSP engine will be used and the DSP coprocessor 22 and DOS engine 24 will not be connected to the external bus. In these applications the external bus interface on PGA 50 will not be required. Accordingly, external bus control will be asserted directly by PGA 48 over control lines 46.

The DSP engine 10 and the other components, 20, 22, 24, 26, 28 and 70 are on individual cards which plug into a motherboard containing the external bus 12, main SIO serial input/output data line 52, auxiliary serial input/output line 54, step/direction lines 56, sensor SIO lines 58 and 60 and miscellaneous RS422 and RS232 lines 62, 64 and 66. These lines are preferably connected via a plug-in connector to connection board 68.

The step motor driver board 70 would not normally be connected to the external bus 12 whenever a real time clock/interfacer 20 is attached, as both provide direct motor control functions, and are alternative methods of motor control.

A minimal motion control system would include the DSP engine 10 with communications to motors, servos, relays and other inputs and outputs being via the main SIO 52. In a more common configuration, however, the DSP engine 10 would be accompanied by either the real time clock/interfacer 20 or by a step motor driver 70 providing motor control in the case of step motor driver 70 and motor (and/or servo) control with additional serial I/O control in the case of the real time clock/interfacer 20.

The step motor driver 70 includes power for the motors being driven, whereas the real time clock/interfacer is designed for connection to amplifiers which drive the step motors, DC brush motors, DC brushless motors and AC brushless motors. The real time clock/interfacer is described more fully below, as it also includes shared memory and multiple additional serial I/O data lines. Motor connections to the step motor driver are not shown, but would be handled in a similar fashion to the motor connections shown connected to the real time clock/interfacer 20.

An advanced configuration would include the DSP engine 10, containing the digital signal processor 32 and one or more coprocessor boards 22, 24, with the expansion connector 28 connected to an external computer 30, arbiter 26 and the real time clock/interfacer 20 to control the motors.

Digital signal processors are particularly efficient at performing calculations needed to control motion, and are less efficient at handling data—which is the province of generalized computer microprocessors such as the processor which would be located on optional DOS engine coprocessor board 24.

To permit the DSP engine 10 to operate in a standalone mode without the assistance of a general microprocessor, the present design offloads most of the input/output work involved in addressing and data handling through a combination of shared memory architecture, direct memory accessing and bus arbitration accomplished in programmable gate array 48 located on the DSP engine 10. This is accomplished in the serial I/O (SIO) system. The main SIO, described first, is implemented in PGA 48 which is shown in FIG. 2b and in the state diagrams of FIGS. 3a, 3b and 3c.

The functioning of PGA 48 is controlled by serial EPROM 51 which programs the PGA 48 either on initial power up or under control of the DSP 32. EPROM 51 is socketed and replaceable to reconfigure the PGA 48 and change the operation of any functions it performs.

Summarizing the operation of the main SIO, digital data to be moved along the main SIO serial data line 52 includes various types of input and output data from input and output devices. Output data may include simple on/off binary data, such as, one bit to signal that a control panel light should be turned on or off, or another bit indicating that a relay should be fired.

Most often, the SIO outputs will be used for tasks other than motor control. Motor control will usually be handled more directly by DSP 32 through the real time clock/interfacer 20 or the step motor driver 70. However, multiple bit output data can easily be sent on the SIO line, and this could include multiple bits signaling the number of steps and direction that a step motor should move.

The output data, i.e., data to be output by the DSP to external devices, is stored in a specified shared memory portion of the static RAM 36. The RAM 36 as well as the E2ROM 34 are shared by the digital signal processor 32, the DMA access means designed into PGA 48 and other processors, such as DSP coprocessor 22 or DOS engine coprocessor 24 which have access to the external bus 12.

PGA 48, which implements the SIO system, has direct memory access (DMA) to the shared memory through local bus arbitration, also implemented in the PGA 48. The PGA 48 reads the output data portion of the static RAM and serially shifts that data onto the main SIO serial data line 52 through line 72 and buffers 74. As the output data flows out the serial line, input data flows in the opposite direction from the serial data line 52 through the buffer 74 and out into a shared memory location dedicated to input data located in static RAM 36.

Through this SIO design, addressing overhead and data handling by the digital signal processor 32 is avoided. The DSP simply reads whatever input data it needs from the memory which is constantly being refreshed and updated by the synchronous operation of the SIO system. Whenever data is to be sent out the serial data line 52, the DSP simply puts the output data into the appropriate output data shared memory locations in the static RAM 36. The SIO system can then be relied upon to move the data to the appropriate output device without any further action by the DSP. In this way, the DSP can concentrate on performing the tasks which it is optimized for.

Referring to FIG. 2b, the operation of PGA 48 and the DMA access means, SIO and bus arbitration are shown in greater detail. Implemented in the PGA 48 is at least one serial I/O shift register 76. Multiple shift registers may be employed to produce multiple SIO systems from the DSP engine board 10.

The serial I/O shift register 76 in the preferred embodiment is a 16 bit shift register (corresponding to the word size of the DSP 32), which is loaded in parallel fashion with one word, i.e. 16 bits of output data obtained from the output data storage locations in static RAM 36 via the DMA access means. Once the output data is loaded into the serial I/O shift register 76, the data is synchronously clocked out over the serial data output line 78, which is one of the four lines 78, 80, 128 and 130 shown in FIG. 2a coming out of the serial buffers 74. These four lines form part of the complete serial data line 52, more fully described below.

As the serial data is shifted out bit by bit from the serial I/O shift register 76 onto the serial data output line 78, serial input data is simultaneously shifted in bit by bit into the shift register along the serial data in line 80. When one word, i.e. 16 bits of data, has been shifted out onto the serial data output line, one word of input data will have been shifted into the shift register 76. At this point, the input data is parallel read out of the shift register over data line 82 and ultimately written into the static RAM 36 into the input data storage locations via serial I/O sequencer 84.

Another DMA cycle then repeats by reading output data from the output data storage locations in 36 and writing that data into the serial I/O shift register 76.

Figure 3A:
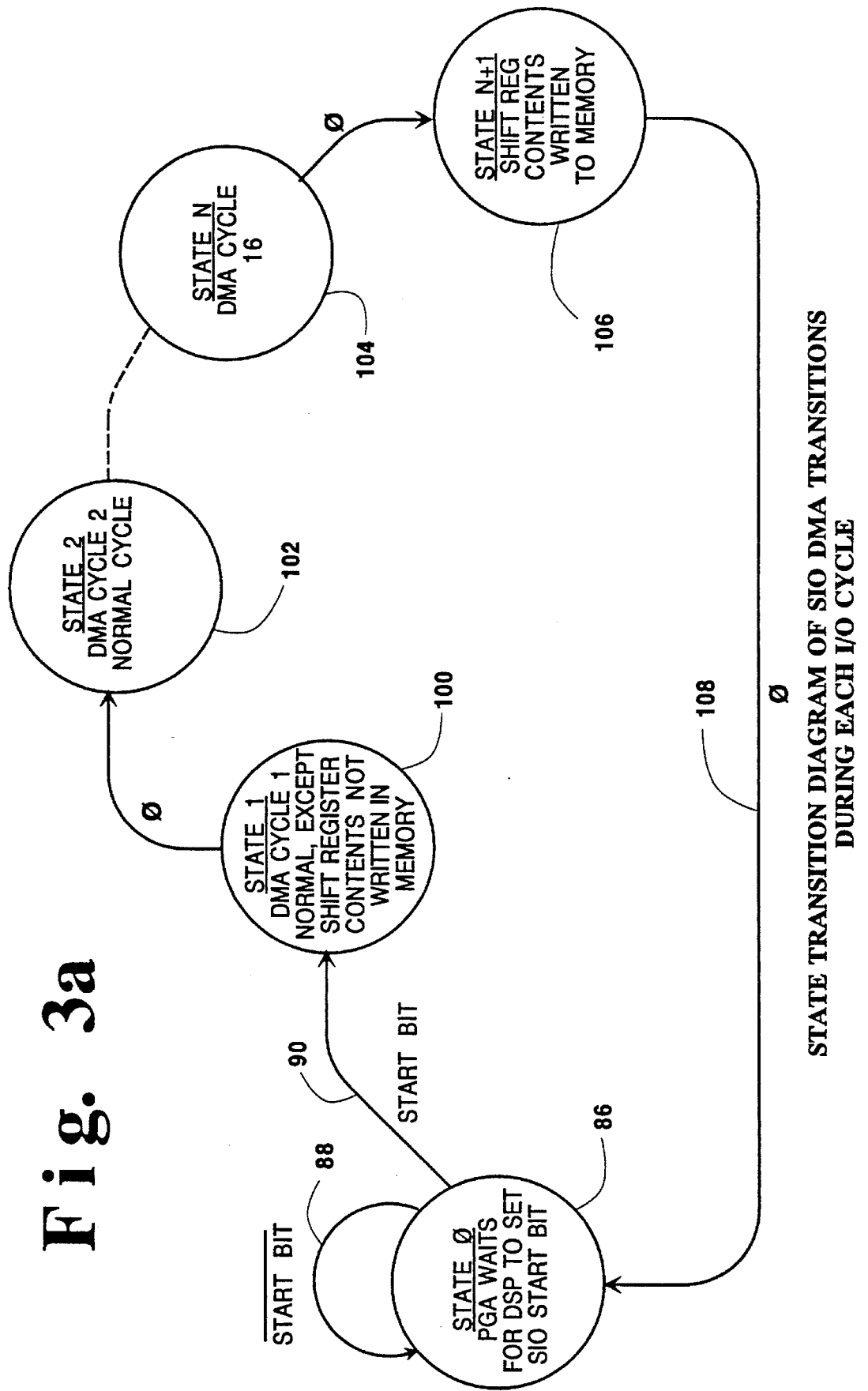
FIG. 3a is a state diagram describing multiple SIO (serial input/output) DMA (direct memory access) transfers during each I/O cycle.

A state diagram of the serial I/O DMA transfer just described is given in FIG. 3a. In state 0 of block 86, PGA 48 is waiting for the DSP 32 to set the serial input/output start bit which begins the complete I/O cycle.

Prior to assertion of the start bit, PGA 48 remains in state 0 waiting for the initiation of a complete I/O cycle. This is indicated by arrow 88 in FIG. 3a.

At the appropriate time, which in one embodiment occurs every millisecond, the digital signal processor 32 writes the start bit and shifts the PGA 48 into state 1 via arrow 90.

Figure 2A:
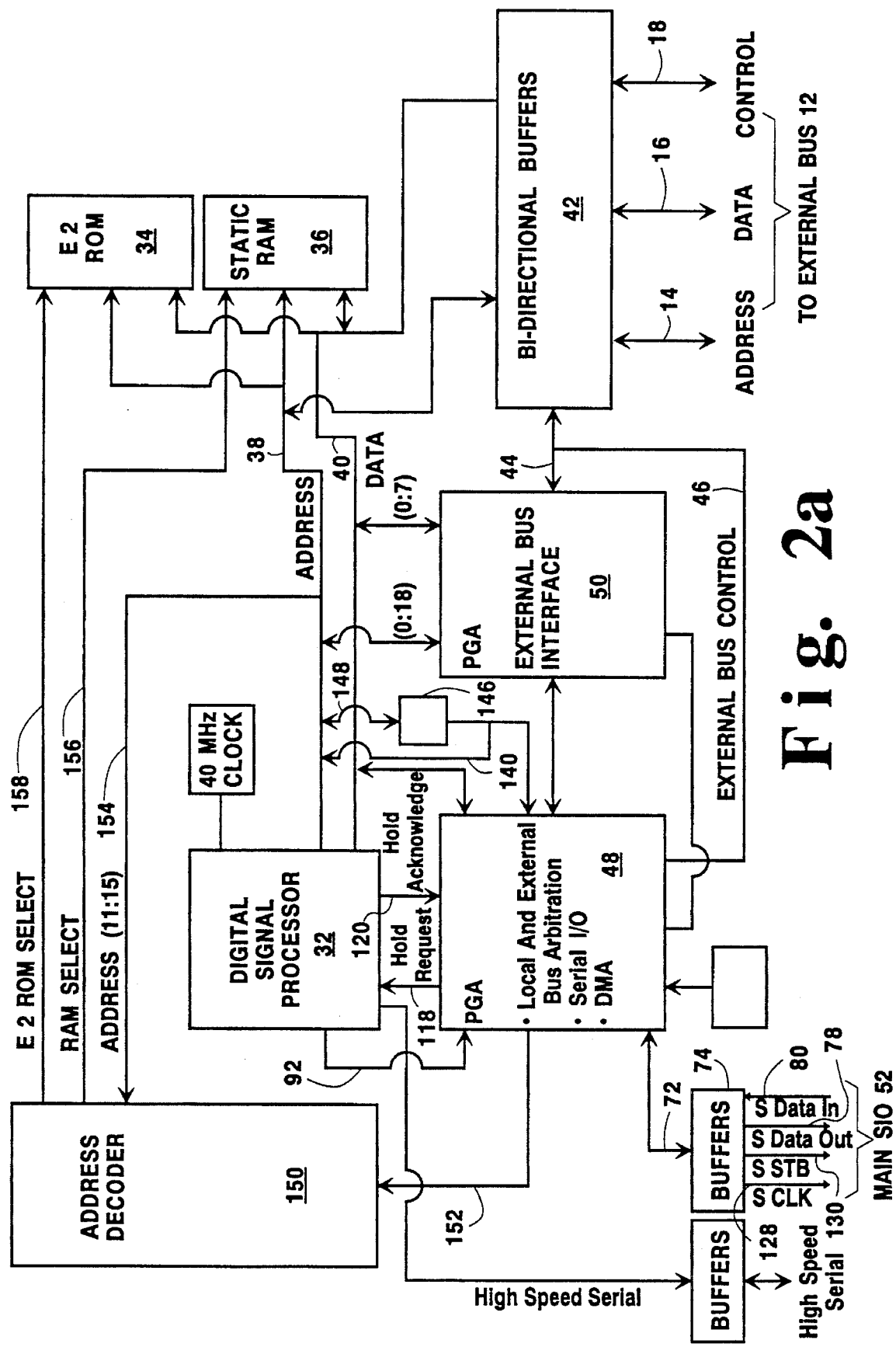
FIG. 2a is a circuit diagram of the digital signal processor (DSO) engine 10.
Figure 2B:
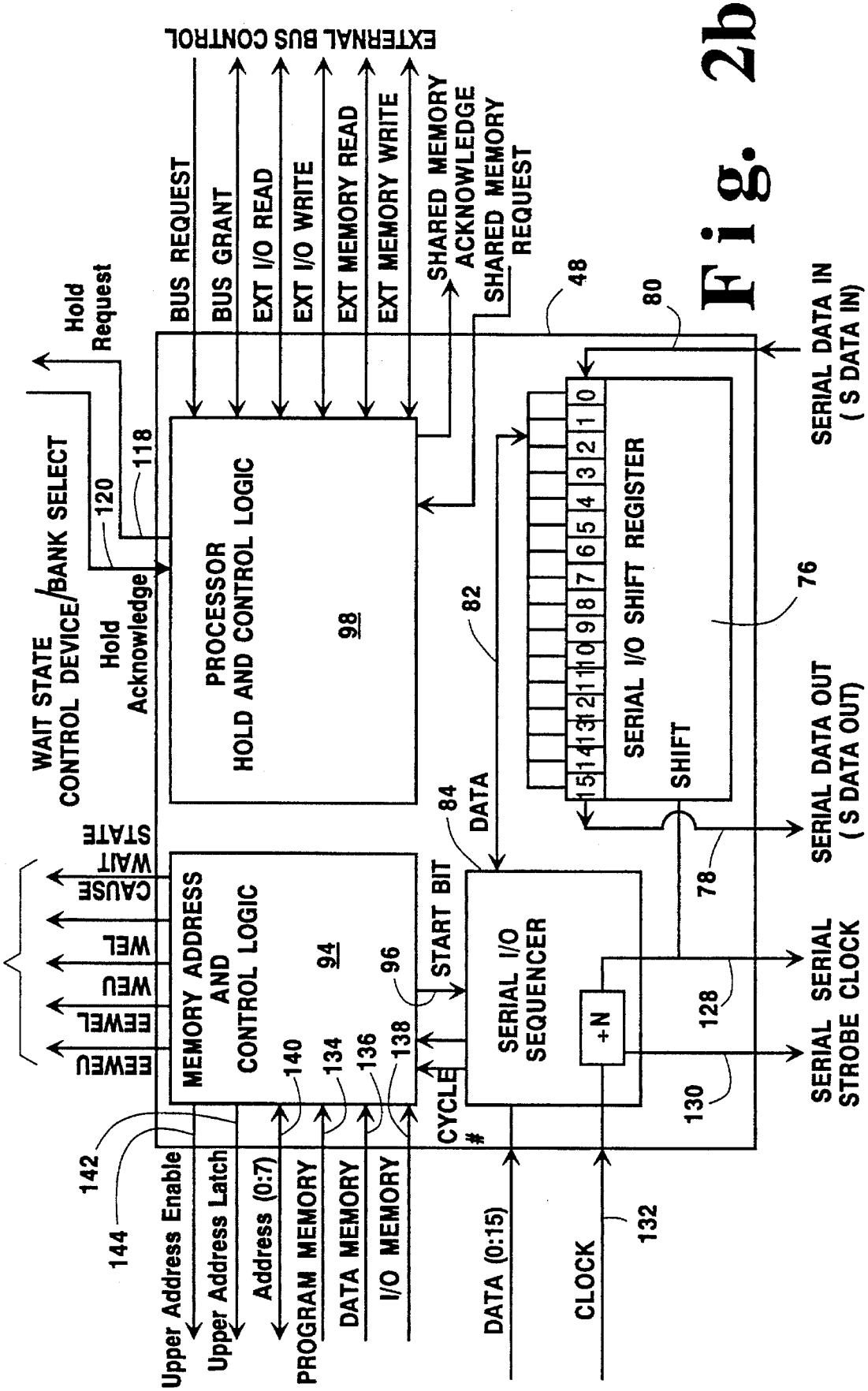
FIG. 2b shows the logic and operation of programmable gate array)PGA) 48 on the digital signal processor engine 10.

The start bit can be implemented in numerous ways, however, in the preferred embodiment, the start bit is written to the PGA over address and data lines 38, 40 into the I/O memory space which is selected by a memory space select line 92 in FIG. 2*a*. The memory space select line permits selection between program memory, data memory and I/O memory.

The I/O write operation to the one bit register into PGA 48 is decoded by the memory address and control logic 94 implemented in PGA 48. The start bit controls the initial I/O cycle via the serial I/O sequencer 84 over control line 96.

Once the start bit has been asserted, DMA transfers begin according to the state diagram in FIG. 3*a*. The DMA access means, implemented in the memory address and control logic 94, and the processor hold and control logic 98 then shift sequentially through the next N+1 states in FIG. 3*a*, beginning with states 1 and 2 marked with reference numbers 100 and 102, and continuing to states N and N+1 marked with reference numbers 104 and 106 respectively. Each of the N+1 states involves writing output data out of the serial I/O shift register 76 and into memory and reloading the shift register 76 with output data, with the exception of states 1 and N+1.

These first and last states differ slightly from the other states. In state 1 the shift register 76 needs to be loaded with output data, but it has not yet been filled with any input data to be stored in memory. In state N+1 input data has been received but there is no output data for this last I/O cycle.

Upon completion of state N+1, the DMA access means incorporated in elements 94 and 98, as implemented in PGA 48, shifts back to state 0 via arrow 108 in FIG. 3*a*.

Figure 3B:
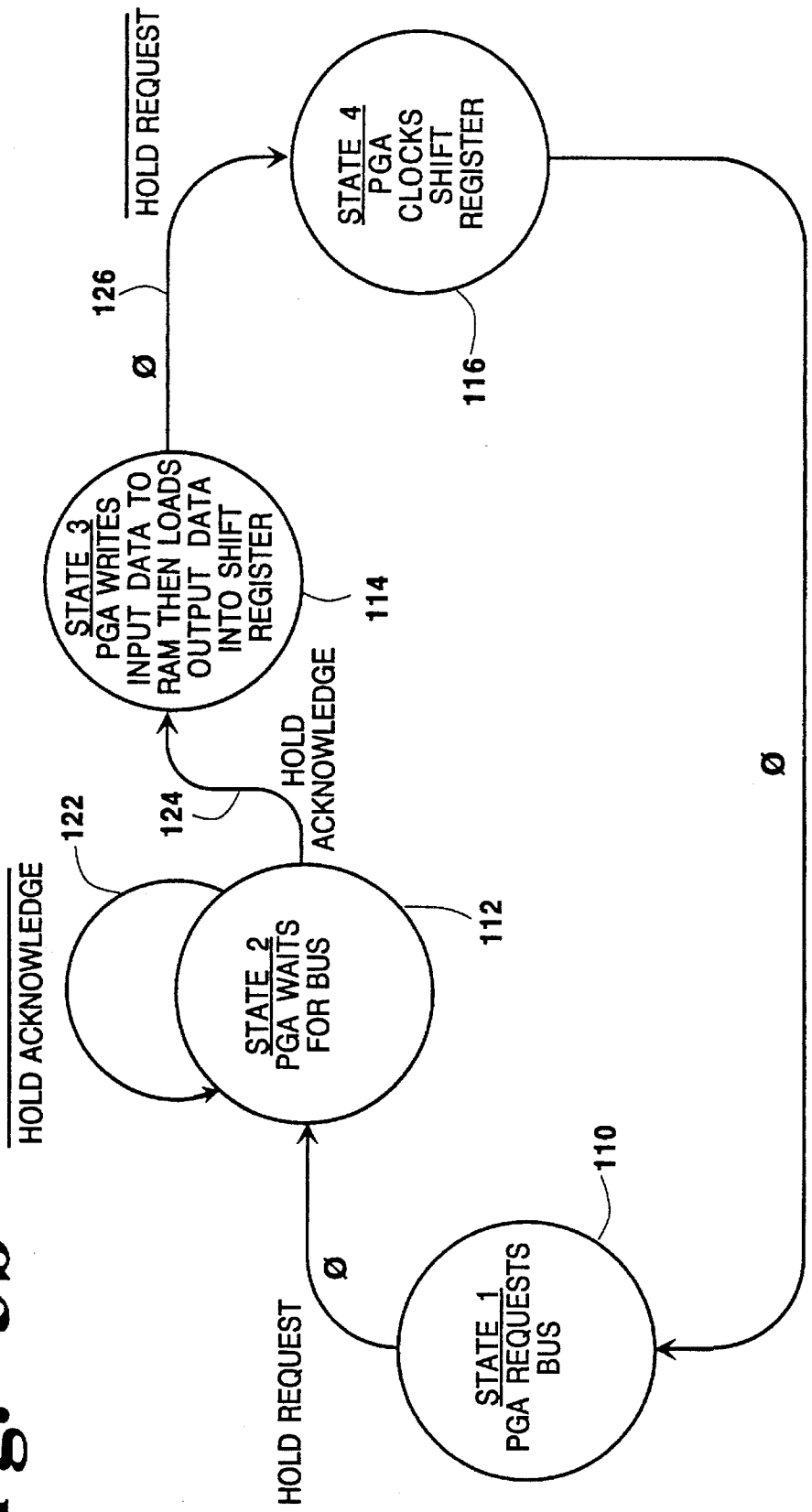
FIG. 3b is a state diagram of the individual DMA cycles in FIG. 4.

Referring to FIG. 3*b*, one complete normal DMA cycle is described as it would occur in states 2 through N in FIG. 3*a*. FIG. 3*b* illustrates the four states identified with reference numbers 110–116 which occur in order to implement the shared memory features wherein the DMA access implemented in PGA 48 shares the memory with the DSP 32. In state 1, the PGA 48 requests access to the local bus 38, 40 so that it may write the input data presently located in serial I/O shift register 76 into the shared memory located in a portion of static RAM 36.

To request the bus the PGA asserts the hold request line 118 through the processor hold and control logic 98. In state 2, reference number 112, the PGA is waiting for the DSP 32 to release the local bus. In this state, the hold acknowledge line 120 is deasserted and the PGA remains in state 2 via arrow 122 in FIG. 3*b*.

At some point, the DSP will free the local bus by asserting hold acknowledge on line 120 and the PGA will shift into state 3, reference number 114, over arrow 124. In state 3, the PGA has control of the local bus and writes the input data from the shift register 76 into static RAM 36, then copies the output data from the output storage portion of static RAM 36 into the serial I/O shift register.

The PGA 48 then deasserts the hold request line 118, returning control of the local bus to the DSP, and shifts into state 4, reference number 116 over arrow 126. In state 4, the PGA clocks the shift register, shifting out the newly loaded output data and shifting in new input data. The clock also is sent out the serial data line over the serial clock lead 128. Serial strobe line 130 is also provided as a part of the serial data line which causes digital I/O circuitry (described below) at the far end of the serial data line to latch in a new set of input data and to send out a new set of output data.

The serial strobe and serial clock line are controlled by the serial I/O sequencer 84 which is synchronized with the processor clock via line 132 (not shown in FIG. 2*a* to simplify the drawing).

Memory space select line 92 includes program memory, data memory and I/O memory select lines 134–138. The local bus includes 19 address lines but for reduced costs, only 8 of the address lines are connected to the PGA 48 over lines 140. Control lines including upper address enable and upper address latch lines 142, 144 operate through an address control system 146 shown in FIG. 2*a*, to convert the address to the full address as is necessary before it is sent onto the local address bus over 148.

Generalized address decoding, ready state generation, wait state control and device/bank select are controlled by address decoder 150 using line 152 to communicate with PGA 48 and control lines 154, 156 and 158 for address static RAM select and E2ROM select respectively.

FIG. 3*c* gives a state diagram summary of the local bus arbitration. In normal state 0, reference number 160, the DSP controls the bus and the hold request line 118 is deasserted. When hold request is asserted by the PGA, either due to DMA access requirements of the serial I/O system or because access to the memory 36 has been requested by an external device on the external bus 12, PGA 48 will assert hold request and move to state 1 over arrow 162.

In state 1, the PGA waits for the DSP 32 to release control of the bus. State 1 is indicated with reference number 164 and remains in this state over arrow 166 so long as hold acknowledge is deasserted. So long as hold request remains asserted, the PGA will shift into state 2, reference number 166, over arrow 168 when hold acknowledge is asserted by the processor. However, if hold request is deasserted before hold acknowledge is asserted, the system will return to state 0 over arrow 170.

During state 2, the local bus will be in use for data transfer to memory. After the data transfer by the PGA or external processor, hold request is deasserted and the system returns to state 0 over arrow 172.

The system has been described with a serial input/output system that employs a single 16 bit shift register 76. In a simple design wherein a maximum of 16 bits of input and output data are required, the single shift register could be fully loaded with input and output data on each I/O cycle, and only one DMA cycle would be necessary. Where more I/O data must be handled, a larger shift register could be employed, however in the present embodiment, maximum flexibility for the system with the least cost has been retained by implementing N+1 DMA cycles as just described in connection with FIG. 3*a* for each I/O cycle (there is one extra DMA cycle because only output data is handled on the first cycle and only input data is handled on the last cycle.)

In one embodiment of the invention, N is 16 and accordingly, there are 256 bits of input data and 256 bits of output data which are moved in 17 DMA cycles, each comprising one parallel read of the one word shift register contents and one parallel write to fill the shift register with output data.

The number N of DMA cycles can be increased or decreased for each complete I/O cycle to increase or decrease the total number of bits shifted on the serial data line.

The digital data on the serial data line can be used quite flexibly to send and receive signals from all types of sensors, actuators, etc. and, where desired, it can also be used for motor control in the multi-axis motion control tasks. However, in most designs the main serial data line 52 will be used for related I/O and a dedicated motor control system will be more directly controlled by the DSP engine 10. This motor control may take the form of a dedicated step motor driver board 70 or a real time clock/interfacer 20.

The interfacer 20 includes an additional portion of shared memory 182, accessible by the DSP 32 over the external bus or by PGA 184 located on the interfacer 20. PGA 184 does bus arbitration for access to the shared memory 182 substantially as previously described in connection with PGA 48.

PGA 184 also implements two additional sensor SIO systems over serial data lines 58 and 60 through buffer 188. These serial data lines operate as previously described in connection with the main SIO line 52. A shift register is implemented within PGA 184, as is DMA access to the shared memory 182 which can be read and written by the DSP engine 10. These lines are adapted for use in returning encoder data to the PGA 184 from encoders attached to motors controlled over one or more of the drive outputs 322–328. The encoder data is counted and formatted and placed on the serial data lines 58, 60 by a digital I/O unit (DIO). The DIO may be at a remote location, close to the motor upon which the encoder is mounted.

A generalized description of a digital I/O module is shown in FIG. 4. The serial data line enters at the left side and includes the serial input out 190, the serial output in 192, the system clock 194 and the serial clock and serial strobes 196 and 198.

These DIO serial data lines could be connected to the serial data line leads 128, 130, 78 and 80 described in connection with the main SIO 52, but also could be connected to the serial data line in sensors SIOs 58 and 60.

In the case of connection to the main SIO line, serial output data from shift register 76 would be shifted out the serial data out line 78 (FIG. 2a) and into the generalized DIO 300 on serial output in lead 192. The data would enter output shift register 302 under the control of the serial clock on lead 196, which would be connected to lead 128 in FIGS. 2a and 2b.

The output shift register 302 may be of any convenient length and is shown as having $N_0$ bits. In a simplified design having only a single digital I/O module, $N_0$ may equal the total number of output bits, however, in many designs there will be multiple DIO modules, daisy chained together and $N_0$ will be less than the total number of output bits.

As the serial clock line is toggled, the first output bit will shift into bit location 0, marked with reference number 304. After $N_0$ clock ticks have occurred, that first bit will be in location in $N_0$ of output register 302 marked with reference number 306. Where $N_0$ is less than the total number of output bits, serial clock ticks will continue to shift the first bit out of location 306 and onto the serial output 308, which would normally be connected in daisy chain fashion to a second remotely located digital I/O module where it would be shifted into another output shift register. Alternatively, no other DIO module need be connected, in which case the initial output bits would not be used and only the last $N_0$ bits would be used by the DIO module, 300. Upon completion of the entire I/O cycle, comprising the N+1 DMA cycles of FIG. 3a, output shift register 306 will contain the last $N_0$ output bits and serial strobe line 198 will transfer those bits and latch them into the output processing logic 310. The output processing logic 310 will have $M_0$ physical outputs with various buffers and power control in module 312 to fire relays, turn on lights for binary outputs, etc. The output processing logic 310 may also take multiple bits from the output data and could convert this binary data to analog data via a converter as necessary to control various analog outputs.

In the same manner that the output data shifted, the input data is read from physical inputs via input receivers and buffers 314, $M_I$ physical inputs are fed to input processing logic 316. Upon receipt of the serial strobe signal over line 198, the input data is latched into the serial input shift register 318 where it is sent out on the serial input out line 190.

The daisy chain connection to DIO's down the line includes the serial input in line 320, which brings in additional input bits that shift through the input shift register 318 as the serial clock ticks. Each serial clock tick shifts the output shift register once to the right and the input shift register once to the left in FIG. 4.

In addition to SIO data lines 58 and 60, PGA 184 controls 4 drive motor outputs 322–328. In one configuration, these drive motor outputs are standard step/direction outputs adapted for connection to step motor amplifiers. However, by replacing the PGA 184 with a PGA of a different configuration, outputs 322 and 324 may be configured as serial outputs implemented in the same way as the sensor SIO input/outputs 58 and 60 and the main SIO 52.

For very high resolution micro stepping outputs, PGA 184 has been provided with an interpolation function which provides micro stepping based on interpolated positions calculated by the DSP32 and transmitted to the shared memory 182. Miscellaneous RS232 and RS422 outputs to the system may be connected to external computers, point of sale cash register, modems for remote updates of the operating systems stored in the E2ROM 34 and other functions are available over standard serial communication outputs on 330, 323 and 334.

Connection board 68 may be an applications specific control board dedicated to a particular application which is attached to the external bus carrying modules 10, 22, 24, 26, 28 and 20 and 70 via v a plug in connector. The connection board 68 may contain application specific data which is read by the PGA to determine home position on various motors controlled by the system.

The digital system processor 32 normally runs in the master mode, with the optional digital signal or DOS engine coprocessors 22, 24 operating in the salve mode as controlled by PGA 48 and 50. However, these PGAs amy be socketed and removeable for replacement with differently configures PGAs to run the DSP in the salve mode to another coprocessor.

The E2ROM 34 is non-volatile but is reprogrammable through the external computer 30 or one of the other serial input/output data lines to reload improved software from a remote location.

Description of the Lid Dispenser

Referring to the drawing FIGS. 5–11b in detail, there is shown and described preferred embodiments of a lid dispenser 200, the operation of which may be controlled by the motion controller hardware and software described above. In particular, the lid dispenser may be constructed and operated as part of an integrated automated drinkmaker as shown and described in U.S. Pat. Nos. 4,949,526, 4,989,753, and 5,000,345, the disclosures of which are hereby incorporated by reference. The automated drinkmaker may comprise a cup carousel, a cup dispenser station, an ice dispenser station, and a soda dispensing station, in addition to the lidder assembly as described herein.

The lidder subassembly, FIGS. 5–11b, serves three functions, storage of the lids, separation of the bottommost lid from the rest of the stack, and the application of the separated lid onto a cup. The operation is substantially as shown and described in U.S. Pat. No. 4,949,526, with the exception of certain features and operations described herein. The lids are stored in a lid carousel (not shown) in four stacks, which are designed to take a high volume restaurant through a peak demand period without requiring a refill. The lid carousel has a rotatable base, which can be rotated under control of the drinkmaker controller by a stepping motor which drives a belt extending around the rotatable base. The lid dispensing mechanism 200 is positioned below a hole in the base, such that a renewal stack of lids can be rotated and slides over the base until it reaches the hole, at which rotation is stopped, to allow the renewal lid stack to fall through the hole into the lid dispensing mechanism 200.

Figure 5A:
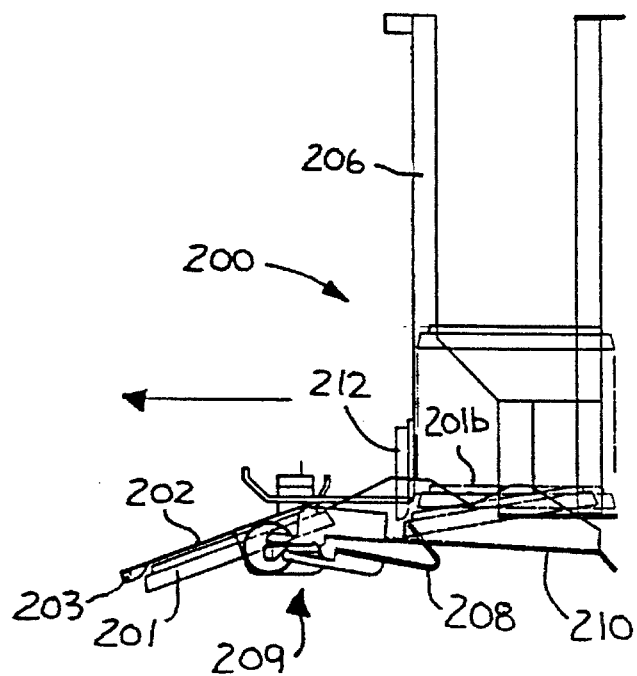
Figure 5B:
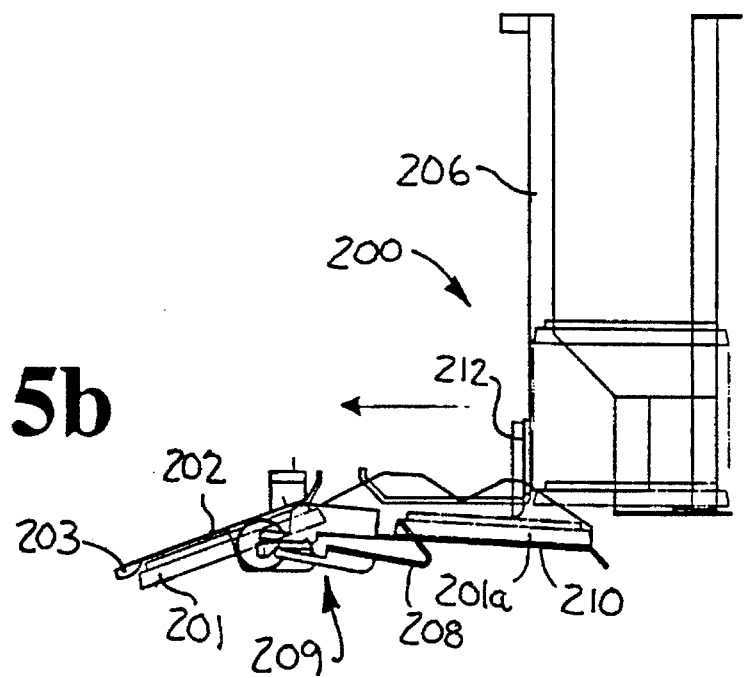

The lid dispenser 200 uses a linear motion, as illustrated in FIGS. 5–10, to pull a lid 201*b* (to the left as shown in FIGS. 5*a* and *b* and 6*a* and *b*) from the bottom of a stack and load it into a lid applicator 202. The lid applicator 202 moves in a straight, horizontal line over cup 204 as it applies lid 201 thereto. At the start of the lid application procedure, lid 201 catches on the front edge of the cup, FIG. 6*a*. As the applicator is drawn rearwardly (to the right as shown FIG. 6*b*), the lid is pulled out of the applicator and is applied by a lid presser 203 onto the cup. The lid presser 203 maintains a steady downward pressure on lid 201 as it is being drawn out of the applicator, causing the lid to snap onto cup 204. A cup platform elevator 250 supports the cup and is moveable up or down by a stepper motor directed by the controller to adjust the top of the cup 204 to the proper height for lid application. The lid applicator 202 is preferably constructed of a high yield strength alloy which is designed to apply a relatively constant predetermined force downwardly upon the lid regardless of the magnitude of the deflection of the lid applicator, within normal operating conditions. It should be recognized that cups are delivered within a given tolerance range as to their height which will cause more or less deflection of the lid applicator.

The lid dispenser 200 comprises a lid stack support and frame 206 for supporting a stack of lids to be dispensed, a hook 208, a lid shuttle 209, a drive stepping motor (not shown), and drive components, which include a belt drive (not shown) driven by the stepping motor. The lid shuttle 209 is driven linearly by the stepping motor and belt drive, and includes a shuttle frame 210 which includes a pair of spaced lateral supports 222, 222*a* for supporting a lid therebetween, on which is mounted hook 208 with a spring bias upward and also lid presser and applicator 203. The lid stack support 206 accepts lids from the lid carousel and is designed such that a hook 208 enters through the bottom of the stack and catches on the inside lip of the bottommost lid. With the hook engaged on the lid, the lid shuttle 210 is moved forwardly (to the left) and slides the lid out from under the stack FIG. 5*a*. As the lid and shuttle move forwardly, a fixed wall 212 forces the lid and shuttle to pivot down, as shown in phantom lines in FIG. 5*a*, beneath wall 212 (FIG. 5*b*) until the lid clears the wall, whereupon the shuttle frame 210 pivots upward to its normal, biased horizontal position. Once a lid has been pulled from the lid stack, the dispenser repeats the cycle. Each time through the cycle, the lid on the shuttle frame 210 is pushed against wall 212 into the lid applicator 202 and another lid is pulled out from under the stack and wall 212.

The lid applicator 202 is attached to the lid shuttle 209 of the lid dispenser, and functions to properly position a lid relative to a cup and also to provide the force necessary to apply the lid onto a cup. As the lid dispenser moves rearwardly, the lid applicator 202 is dragged over the top of a cup 204, applying the lid to the cup as it moves. The applicator is a simple cantilevered plate with a contoured front edge. Significant design parameters of this device are the angle at which it approaches the cup and the spring rate of the catilevered plate.

Figure 8:
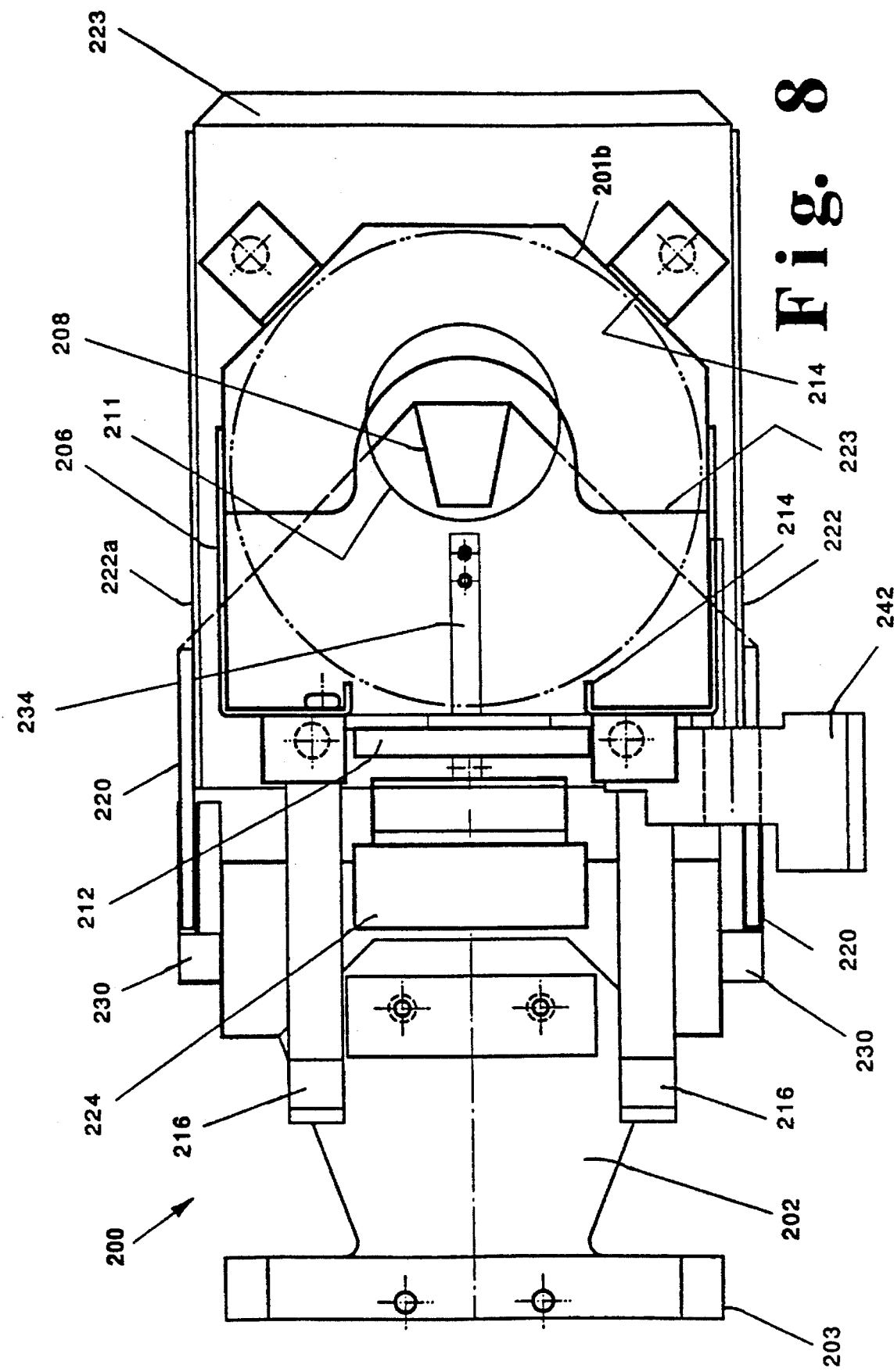
FIG. 8 is a top plan view of the lid dispenser in the retracted position of FIG. 7.
Figure 9:
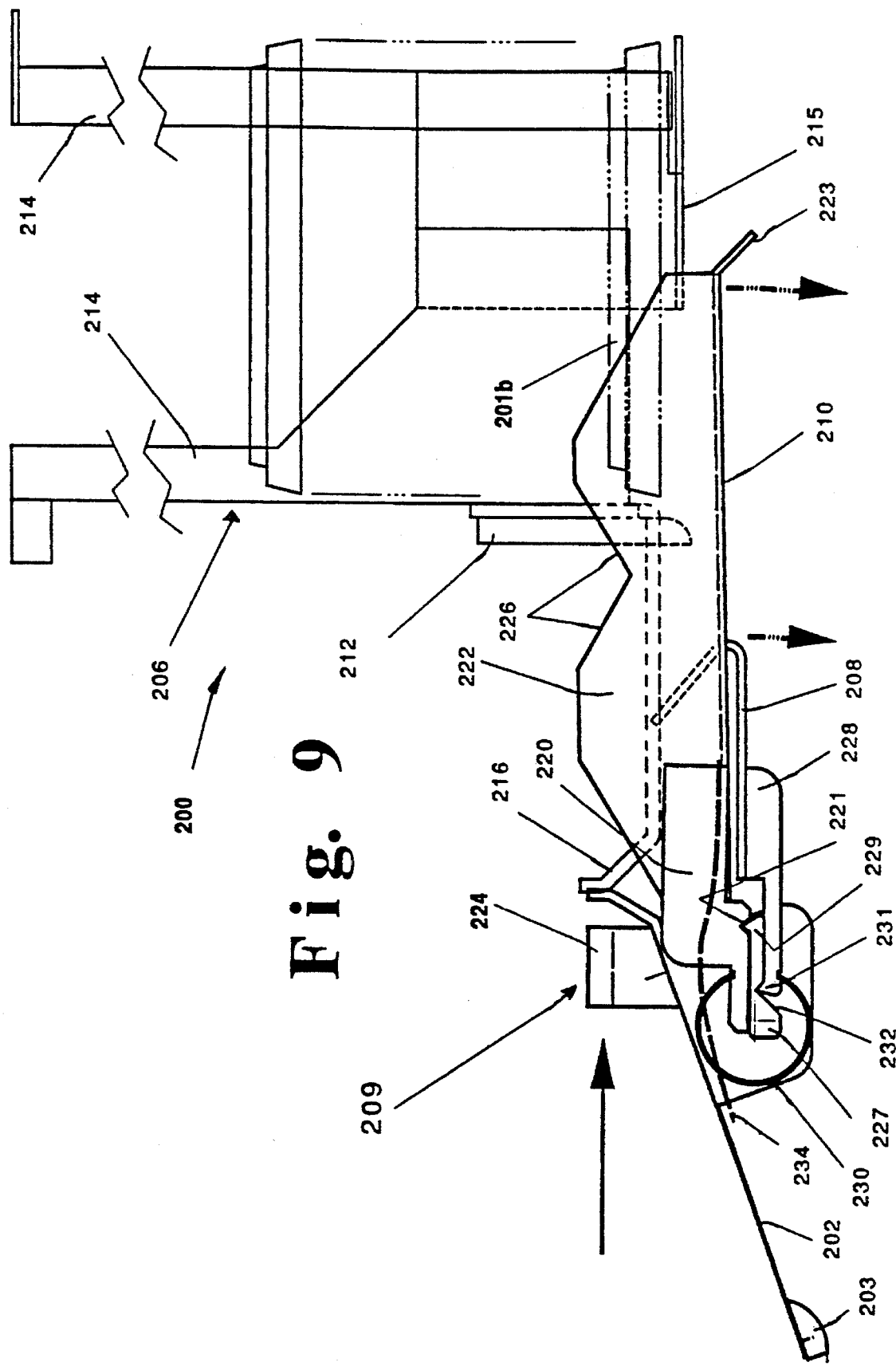
FIG. 9 illustrates a side elevational view of the lid dispenser with the lid shuttle being in an expanded position, ready to apply a lid onto a cup as it moves to a retracted position.
Figure 10:
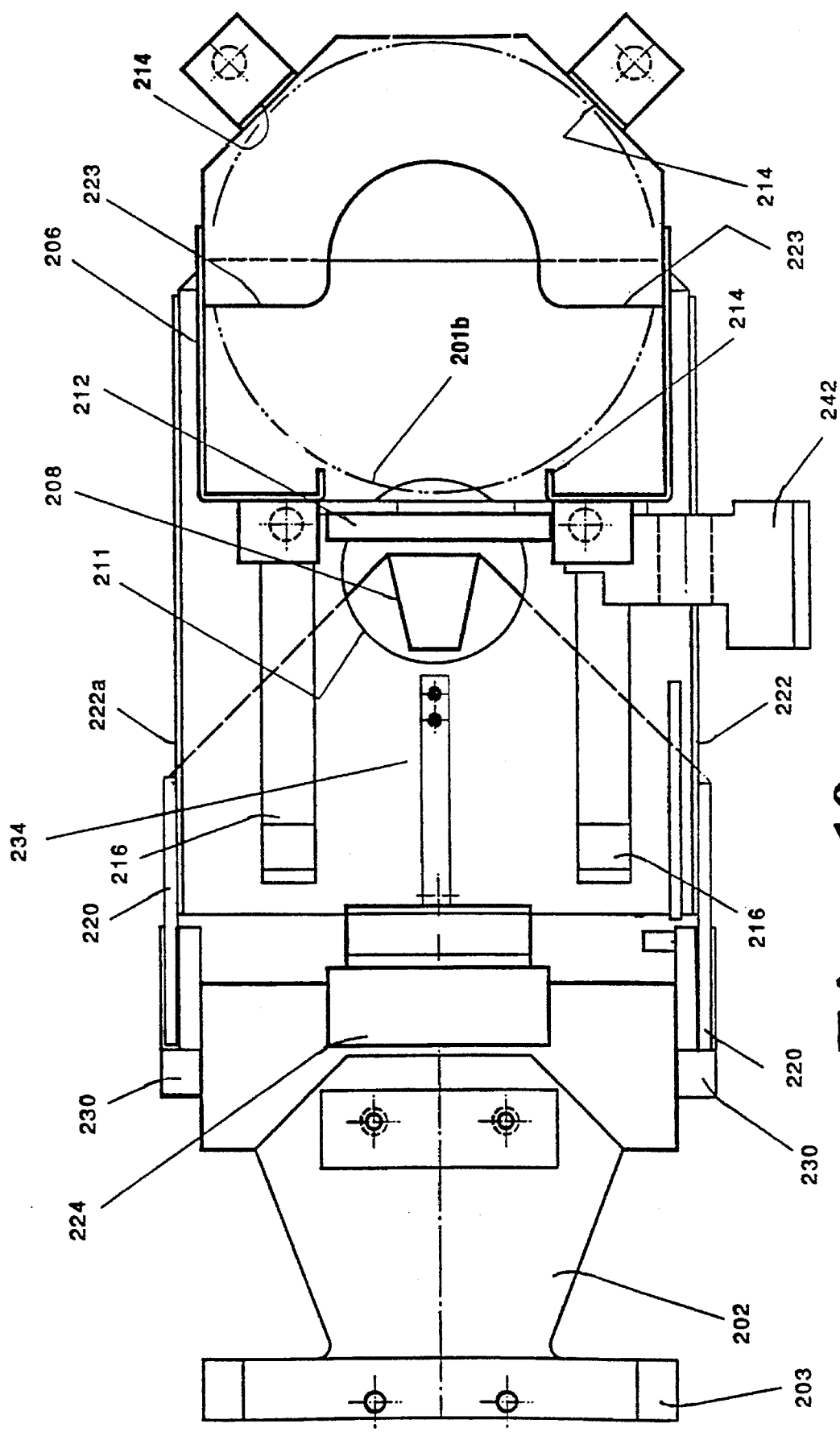
FIG. 10 is a top plan view of the lid dispenser in the expanded position of FIG. 9.

FIGS. 7 and 8 illustrate respectively a side elevational view and a top plan view of the lid dispenser 200 with the lid shuttle 209 being in a retracted position, ready to pull a lid from the bottom of a lid stack. FIGS. 9 and 10 illustrate respectively a side elevational view and a top plan view of the lid dispenser with the lid shuttle being in an extended position. The lid shuttle is supported for movement by two spaced horizontal slider bars (not shown), which support it during its linear translational movements, and is driven therealong by the belt drive actuated by the stepping motor under the control of the drinkmaker controller.

The lid stack frame 206 is supported in a stationary position directly below the hole in the lid carousel base, and includes vertically extending lid stack constraining members 214 and a pair of spaced bottom lid stack supporting members 215 which position and support the lid stack therebetween. The support of the weight of the lid stack across the two spaced support members advantageously results in a slight lowering of the middles of the lowermost lids in the central portion between the spaced support members. This results in a slight opening or fanning out of the lid edges at the central portion, which assists in the lid hook 208 engaging and removing the lowermost lid from the lid stack. The lid hook 208 is secured to the lid shuttle 209 and travels between the spaced supporting members 215 as illustrated in FIGS. 7 and 8. The frame 206 supports a pair of spaced horizontal guides 216 which provide a top restraining guide for the lids as the lid shuttle 209 and lid hook 208 moves the lids forwardly during operation. The horizontal guides 216 are bent upwardly 90° at their rear portions, FIGS. 20, 22 and the 90° bent portions are secured to the frame of the lid tower 206. The height of the 90° bends are such as to abut against and restrain the second lowest lid in the lid stack while the bottommost lid is withdrawn from the stack by the lid hook 208 as the lid shuttle 200 moves forwardly.

The frame 206 also supports a fixed wall 212 extending at least part way across the front lower portion of frame 206 which blocks direct horizontal forward (leftward) movement of the bottommost lid from the stack in frame 206. As the shuttle travels rearwardly (right) to engage a lid at the bottom of the lid stack, the hook 208 is forced to pivot down by wall 212 and the front of the lowermost lid. Further, the arrangement is such that when lid hook 208 pulls a lid against wall 212 during forward (leftward) travel of the lid shuttle 209, the shuttle frame is forced to pivot down under wall 212 by its particular construction which will be described below. When the lid shuttle next moves towards its retracted position, the extracted lid moves against wall 212 and with continued movement of the shuttle, is forced into a lid applicator partially loaded position as shown in FIG. 5.

The lid shuttle 209 includes a horizontal, generally U shaped shuttle frame member 210 having lid supporting legs 223 with upturned sides 222 and 222*a*. One upturned side 222 has a distinctive, defined shape 226 to its upper edge which is used to detect the capture of more than one lid, as will be explained in more detail below. To allow lid shuttle frame 210 to pivot downward independently of hook 208, the shuttle frame is supported along sides 222, 222*a* by frame supports 220 which have inverted V shaped cutouts 221 along their lower edges. A member 227 extends outwardly on each side of shuttle forward central portion 224 on its downturned sides 225, and has a pointed fulcrum 229 which extends into the base of V cutout 221. To achieve independent pivoting of hook 208, the hook is mounted to side plates 228 which themselves have a pointed fulcrum 231 which extends upwardly into an inverted V shaped cutout 232 on the lower edges of outward member 227. Biasing of the lid shuttle frame 210 and hook 208 in their normal horizontal positions is provided by C shaped metal springs 230, the opposite ends of which are held in cutouts on shuttle frame supports 220 and side plates 228 to the right of the respective fulcrum and V notch combinations with outward members 227.

Also on the lid shuttle 209, the forward central portion 224 is screwed to and supports the lid applicator 202 therebetween, and is also used to support the lid shuttle 209 on the belt drive mechanism (not shown) by thumb screws or other quick release mechanism. Hook 208, which is centrally mounted beneath shuttle frame 210 and extends up through opening 211 in shuttle frame 210, also includes an inclined surface 218 which contacts the bottom of wall 212 and the lid stack and can be pivoted downwardly against the spring support 230 as the hook passes beneath the wall and lid stack. Also, an elongated leaf or strip spring 234 is secured on one end to the upper surface of the central portion of lid shuttle frame 210. The other end of spring 234 extends to and is biased upwardly against the lower surface of lid applicator 202, to assist in holding a lid in position between the spring 234 and applicator 202 while it is being moved into position over and applied to the top of a cup. The lid presser 203 can assume various shapes and designs, with FIGS. 5 and 6 illustrating a first design thereof and FIGS. 7–10 illustrating a second design.

Figure 11A:
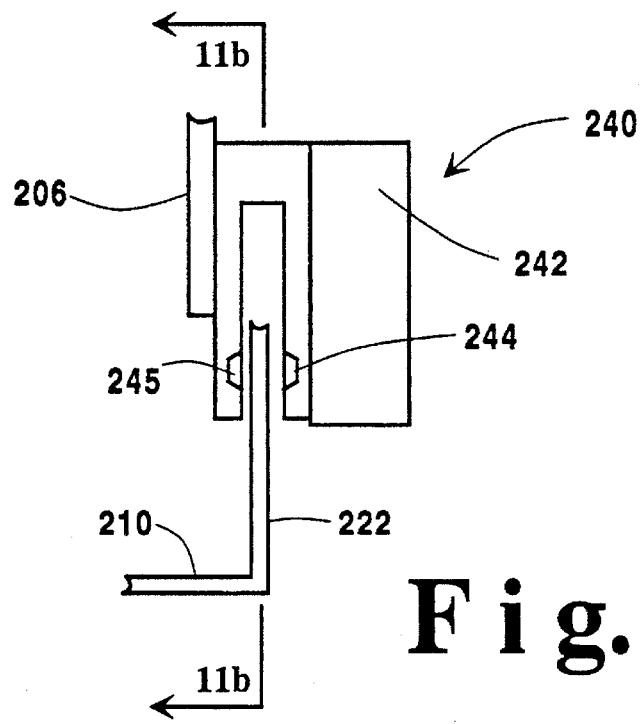
FIGS. 11a and 11b are closeup front and side views respectively of the double lid detecting apparatus of the lid dispenser.
Figure 11B:
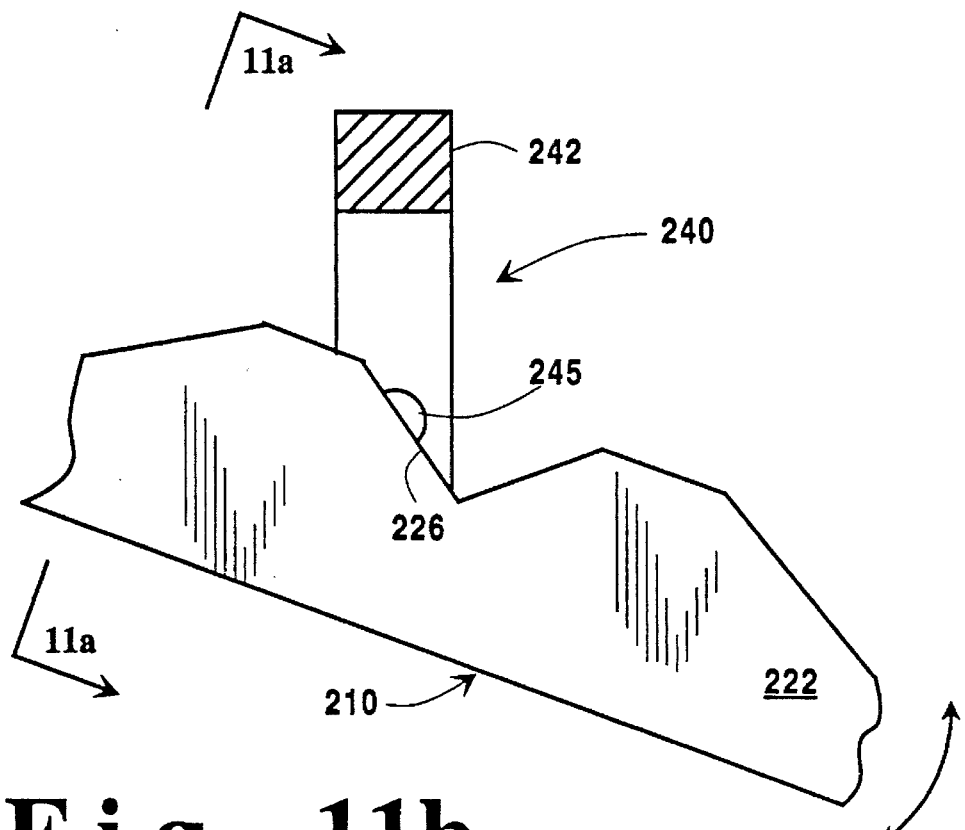

The double lid sensor 240 is shown in detail in FIGS. 11a and 11b comprises an infrared emitter/detector 242 mounted on lid stack frame 206 at a position adjacent the front edge of the frame. The IR emitter/detector 242 is also shown in FIGS. 7, 8 and 10, but is removed from FIG. 9 for clarity. The IR emitter/detector has an inverted U shape as shown in FIG. 11a with the legs extending down on opposite sides of shuttle frame side 222, one leg containing an inward facing emitter 244 and the other leg containing an inward facing detector 245. As shuttle frame 210 carries a lid from the bottom of the lid stack forward and encounters wall 212, the entire shuttle frame 210 pivots downward as indicated. The controller is programmed with the proper shuttle coordinates for the proper moment at which detector 245 should detect V shaped upper side edge 226 if only one lid is being carried on shuttle frame 210. If more than one lid has been engaged by hook 208, the shuttle frame will be at a lower position because of the increased thickness of the lid(s) as they pass below wall 212, and edge 226 will be detected earlier than expected by detector 245. On the other hand, if no lid has been engaged, the shuttle frame will be in a higher-than-expected position and the detector will detect edge 226 later than expected. Thus, the sensor 240 may detect a double (or multiple) lid on the lid shuttle, or no lid at all, and then make appropriate adjustments during lidding and/or signal an error message to be displayed to the operator.

Summarizing operation of the lid dispenser, assume that lids were just placed in the lid tower 206 and that the lid shuttle 209 is in a retracted position (to the right). The controller causes the lid shuttle to move towards its extended position (to the left) and the lid hook 208 engages the forward edge of the bottommost lid, moving it forward. Wall 212 forces the lid and shuttle frame 210 to pivot downward (shown in FIG. 5a), while the bent constraining members 214 block movement of the second bottommost lid. At the same time, the independent pivoting of biased hook 208 continues to engage the lip of the lid to hold it in place during forward movement. The lid sensor 240 determines if only one lid has been captured in the lid shuttle, or if a double lid or no lid condition exists.

Figure 6A:
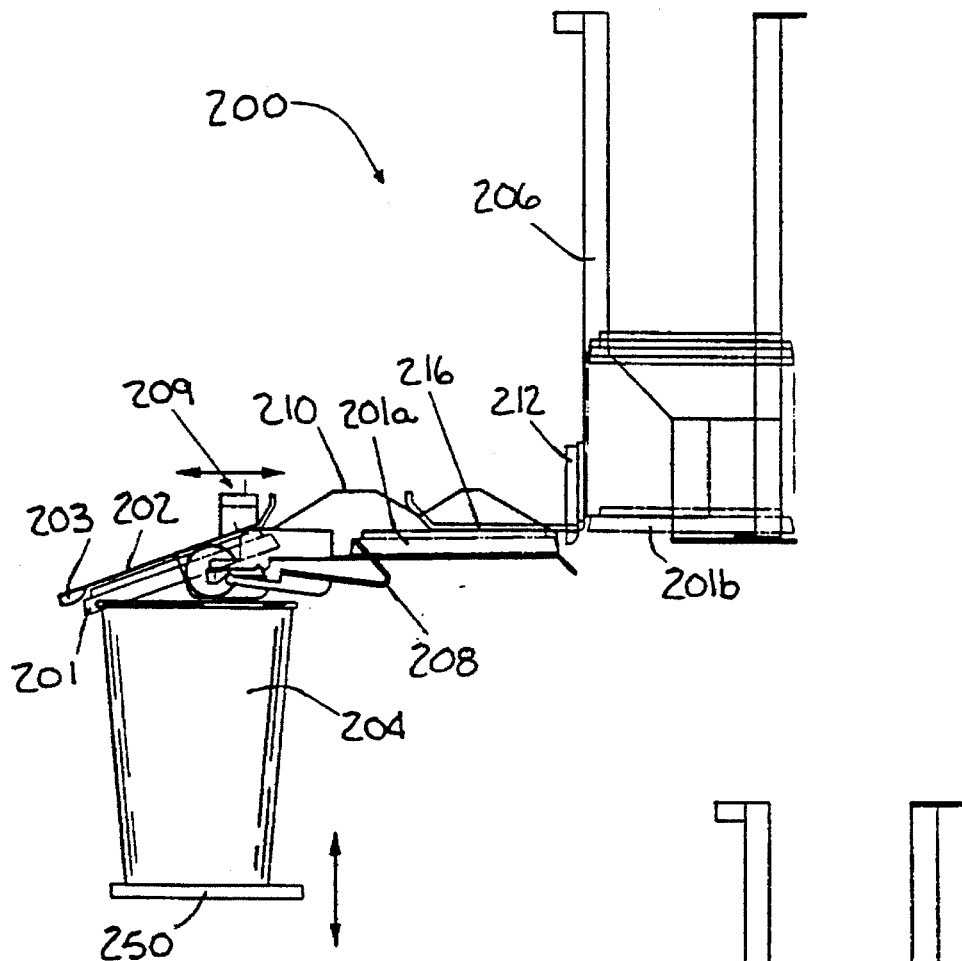
FIGS. 6a and 6b illustrate two successive steps of (following the steps as shown in FIGS. 5a and b) of applying the dispensed lid onto a cup.
Figure 6B:
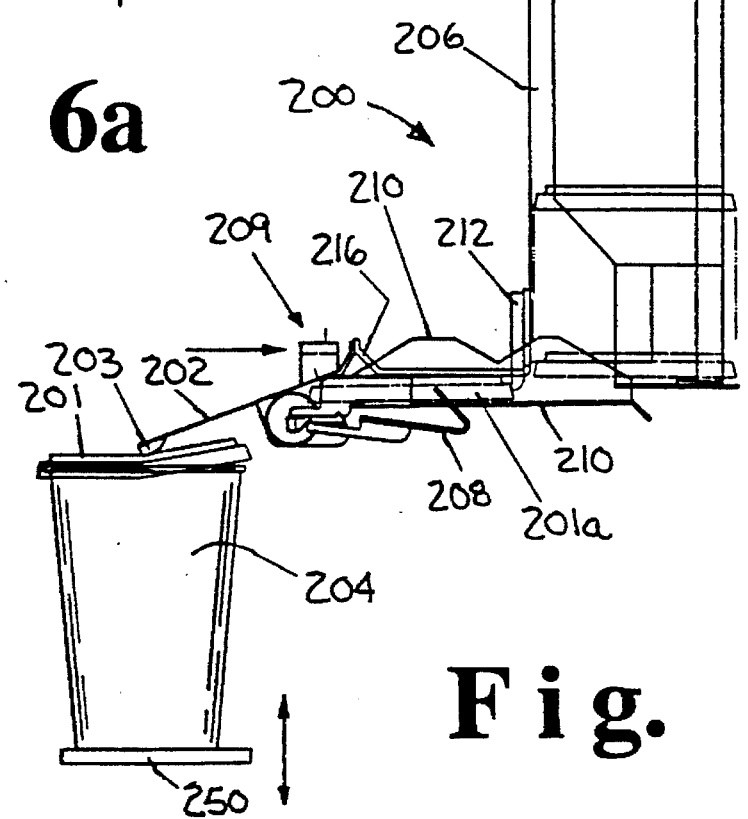

Continuing the summary of the lid dispenser operation, the lid shuttle moves to its extended position, causing the lid to be positioned at the mid position (201a) of FIG. 6a. The controller next causes the lid shuttle to move towards its retracted position, and the extracted lid is then restrained by fixed wall 212 in front of the lid tower 206 (FIG. 6b), and slides under the lid applicator 202 to the partially loaded application position (201) of FIG. 5a. The controller next causes the lid shuttle to move towards its extended position, while the lid hook 208 engages the forward edge of the next lid which is moved into the middle position of FIG. 6a while the first lid is moved into a fully loaded position (201) on the left side of FIG. 6a. The controller next causes the lid shuttle to move towards its retracted position, and the fully loaded lid engages the container therebelow, and is pressed thereon by the constant spring force of the lid applicator 202 as the lid presser 203 presses and snaps it onto the cup during the retraction movement, FIG. 6b. During that retraction movement, the second lid is restrained by wall 212 and is moved into the partially loaded position of FIG. 5a, and the cycle is repeated. Accordingly, each lid is dispensed and applied onto a cup in a procedure requiring a two cycled movement of the lid dispenser 200.

In the event that a double lid is detected, the controller takes appropriate action to adjust the lidding force and/or clearance. Platform elevator 250 may be lowered by signal of the controller to provide extra clearance needed for double lid application, or may be programmed to push up with greater or lesser force against lid applicator 202, as determined by experience and behavior of the type of lids being used. Thus, the occasional sticking of two lids together during extraction from the bottom of the lid stack can be accommodated by the lid dispenser without the necessity to shut the system down, and thereby provides self-correcting operation.

The lid applicator may also included an inductive sensor on the lidder drive. A number of driving pulses are issued to the lid shuttle drive motor, and the processor then checks for a signal from the inductive sensor at the proper time. If one is not received, a lid is assumed to be jammed against the cup, and the elevator is dropped a small distance of approximately a quarter inch. A drive signal is then issued again to the stepper motor, and the processor then checks again for the transition signal from the inductive sensor, indicating successful lidding. If the transition signal is not received, the processor assumes a more serious problem, and an error message is displayed on a display to the operator, requesting a check of the elevator lidder station, and pressing of a service completed button after the check indicates that the elevator lidder station is clear.

While several embodiments and variations of the present invention for a lid dispenser for an automated drinkmaker system are described in detail herein, it should be apparent that the disclosure and teachings of the present invention will suggest many alternative designs to those skilled in the art.

What is claimed is:

1. A multi-axis motion controller comprising:
   a digital signal processor operable in a standalone mode to run a motion control application program for controlling motion along multiple axes;

a digital memory organized in a shared memory architecture for shared read and write access by the digital signal processor and at least one other device, including a first portion of the memory for storing input data received from input devices and a second portion of the memory for storing output data to be sent to output devices; and a serial input/output system including:
 a serial data line for serially transferring the input and output data to and from input and output devices;
 DMA access means for repeatedly moving the input and output data directly between the memory and the serial data line without passing the input and output data through the digital signal processor, the DMA access means having shared read and write access to the digital memory.

2. A multi-axis motion controller according to claim 1 further including motor control means for controlling the location of a plurality of motors under the direction of the application control program on the digital signal processor.

3. A multi-axis motion controller according to claim 1 wherein the digital signal processor runs multiple application control programs, communicating with one another through the shared memory.

4. A multi-axis motion controller according to claim 1 wherein the serial input/output system further includes a clock which runs the serial input/output system synchronously to repeatedly move the input and output data between the memory and the serial data line without passing the input and output data through the digital signal processor.

5. A multi-axis motion controller according to claim 1 wherein the serial input/output system further includes a serial shift register having an input end and an output end, the input end simultaneously shifting in the input data from the serial data line as the output end serially shifts out the output data to the serial data line.

6. A multi-axis motion controller according to claim 5 wherein the DMA access means includes:
 means for parallel reading the input data from the serial shift register after the output data has been shifted out of the serial shift register;
 means for writing the input data to the shared digital memory for use by the digital signal processor;
 means for reading a new set of output data from the shared digital memory; and
 means for parallel writing the new set of output data into the shift register.

7. A multi-axis motion controller according to claim 6 wherein the DMA access means is implemented in a programmable gate array.

8. A multi-axis motion controller according to claim 6 further including a second processor connected to the digital signal processor via a multiprocessor bus, the digital signal processor running in a master mode and the second processor running in a slave mode, and wherein the digital memory is shared by the digital signal processor and the second processor.

9. A multi-axis motion controller according to claim 8 wherein the second processor is a second digital signal processor.

10. A multi-axis motion controller according to claim 8 wherein the second processor is a general purpose computer microprocessor.

11. A multi-axis motion controller according to claim 8 further including a bus arbitrator for arbitrating access to the multiprocessor bus, the bus arbitrator being implemented in a programmable gate array.

12. A multi-axis motion controller according to claim 11 wherein the programmable gate array is loaded by an EPROM which is socketed and adapted for replacement with another EPROM to run the digital signal processor in a slave mode and the second processor in a master mode.

13. A multi-axis motion controller according to claim 11 wherein the DMA access means of the serial input/output system is implemented in a second programmable gate array.

14. A multi-axis motion controller according to claim 1 wherein the digital memory includes volatile random access memory and a non-volatile memory.

15. A multi-axis motion controller according to claim 14 wherein the non-volatile memory is E2ROM.

16. A multi-axis motion controller according to claim 14 further including a modem, and means for remote revising of the contents of the non-volatile memory via the modem.

17. A multi-axis motion controller according to claim 1 wherein the serial input/output means further includes a digital input/output means, connected to the serial data line, for driving a plurality of output devices responsive to output data received from the serial data line and for receiving input data from a plurality of input devices and sending it on to the DMA access means via the serial data line.

18. A multi-axis motion controller according to claim 17 wherein the digital input/output means is remotely located from the DMA access means, the serial data line connecting the digital input/output means to the DMA access means.

19. A multi-axis motion controller according to claim 17 wherein the digital input/output means further includes first and second connections to the serial data line, the first connection connecting the digital input/output means to the DMA access means and the second connection being adapted for daisy-chain connection to one or more additional digital input/output means.

20. A multi-axis motion controller according to claim 17 wherein the digital input/output means is adapted for receiving encoder data from a motor position encoder.

21. A multi-axis motion controller according to claim 17 wherein the digital input/output means is adapted for driving solenoid outputs.

22. A multi-axis motion controller according to claim 17 wherein the digital input/output means is implemented in a programmable gate array.

23. A multi-axis motion controller according to claim 1 wherein the motion controller is mounted in a plug-in module, and further includes a plug-in connector adapted for plug-in connection to an application specific wiring board, the serial data line and the motor control means receiving and transmitting signals through the plug-in connector.

24. A multi-axis motion controller according to claim 23 further including a means for identifying the application specific wiring board to which the motion controller is connected.

* * * * *